United States Patent [19]

Vlahos et al.

[11] Patent Number: 5,742,354
[45] Date of Patent: Apr. 21, 1998

[54] METHOD FOR GENERATING NON-VISIBLE WINDOW EDGES IN IMAGE COMPOSITING SYSTEMS

[75] Inventors: Petro Vlahos, Lake Hughes; Paul Vlahos, Tarzana, both of Calif.

[73] Assignee: Ultimatte Corporation, Chatsworth, Calif.

[21] Appl. No.: 659,918

[22] Filed: Jun. 7, 1996

[51] Int. Cl.⁶ ........................................... H04N 9/75
[52] U.S. Cl. ..................... 348/586; 348/587; 348/592; 348/596; 348/597
[58] Field of Search ........................ 348/586, 585, 348/587, 590, 591, 592, 593, 596, 597; H04N 9/74, 9/75

[56] References Cited

U.S. PATENT DOCUMENTS

| | | |
|---|---|---|
| 4,100,569 | 7/1978 | Vlahos . |
| 4,625,231 | 11/1986 | Vlahos . |
| 5,032,901 | 7/1991 | Vlahos ........................ 348/587 |
| 5,343,252 | 8/1994 | Dadourian .................. 348/586 |
| 5,424,781 | 6/1995 | Vlahos ........................ 348/587 |
| 5,515,109 | 5/1996 | Vlahos ........................ 348/586 |
| 5,557,339 | 9/1996 | Dadourian .................. 348/586 |

Primary Examiner—Sherrie Hsia
Attorney, Agent, or Firm—Blakely Sokoloff Taylor & Zafman

[57] ABSTRACT

The invention is a method used with a system for compositing a foreground scene including a subject before a nonuniformly illuminated colored backing, and a background scene, and where the nonuniformity is nonlinear from side to side and/or nonlinear from top to bottom. A window is employed to mask unwanted areas outside of, or on, the colored backing and one or more window edges form a visible join line where the window edges join the backing. The visible join line is made nonvisible without affecting the subject by a horizontal and vertical linear interpolation method for obtaining backing corrections that cause the backing level control signal to be uniform at the window edges and match an assigned window signal level.

32 Claims, 4 Drawing Sheets

METHOD FOR GENERATING NON-VISIBLE WINDOW EDGES IN IMAGE COMPOSITING SYSTEMS

BACKGROUND

A composite image is formed by a composite of a foreground scene, including a subject placed before a colored backing, and a background scene. The colored backing is replaced by the background scene in the compositing process. On long shots, or when using a small backing, the camera's field of view often overshoots the colored backing and thus shows portions of the stage wall and/or ceiling to the left and/or right and/or above the backing. Rather than extending the backing to fill the camera field, an electronic window is brought in from one or more of the four edges of the frame to mask all of the area outside the colored backing.

The function of the window is to exclude from the composite scene all foreground objects masked by the window and to extend the background scene to the edge of the image frame. The background scene level in the masked area is controlled by the level of a fixed window signal. The background scene level in the adjoining colored backing area is determined by the luminance and visibility of the backing. When the luminance (or color) of the backing is non uniform, the two signals controlling the level of adjoining sections of the background scene are unequal, and the line where the window edge joins the backing becomes visible, making the scene unacceptable.

The visibility of this joining edge is reduced by using a soft edge window. It is also reduced by raising the background scene turn-on voltage, developed by the backing, to exceed a clip level matching the window signal level. The soft window edge reduces visibility of the join line. The clip fully eliminates the join line, but may cause a loss of edge detail on foreground objects. Neither solution is ideal.

It is impossible to front illuminate a large backing on a stage and achieve perfect luminance uniformity when using multiple overlapping light sources that must be kept out of camera view. When the backing extends onto the floor, the differing reflection angles from a vertical back wall and a horizontal floor produce a difference of luminance and color even when the incident illumination is constant. Lens vignetting, causing darkening at the corners, further degrades field uniformity. A non uniformly illuminated backing will result in a non uniform background level control signal (referred to as $E_c$), which results in a background scene that appears to be non uniform, and windows whose edges are quite visible.

Control signal $E_c$ is a direct function of the luminance and visibility of the colored backing. U.S. Pat. Nos. 4,100,569 and 4,625,231 describe such a linear image compositing process. Assuming a blue backing, the control signal $E_c$ from the above referenced patents, is in the form of:

$$E_c = K[(B-K_1)-K_2 max(G,R)] \qquad \text{Eq. 1}$$

where R, G, and B are red, green and blue signal levels, and K, $K_1$, and $K_2$ are constants. This $E_c$ signal is used for several independently controlled functions, including the control of the background scene level, cleanup, inhibiting corrections, etc. It is also used to create processed video (PRY) by subtracting levels of $E_c$ that match backing RGB levels thereby reducing the backing area to black. Processed video (PRV) will also be used in defining the backing area.

The Problem

The window edges joining the backing are nonvisible when the $E_c$ control signal generated by the backing is identical to the window signal where the backing touches the window edge. The problem with attempting to produce nonvisible window edges is the great variation in the manner and degree in which the backing luminance is non uniform. If the backing is primarily illuminated from above, then the luminance is likely to be greater at the top, while falling off toward the bottom. Similarly, if the illumination is primarily from one side, then luminance will likely fall off at the opposite side. This fall off may be linear or nonlinear. The tendency to put greater emphasis on illuminating the subject, will cause a brighter central area with fall off at the sides and corners. Lens vignetting will cause additional fall off at the sides and corners of the captured image. In most cases luminance distribution will be nonlinear in both axes. A solution to the problem of obtaining nonvisible window edges must accommodate a wide range of lighting anomalies, without degrading the subject image.

SUMMARY OF THE INVENTION

The invention is a method used with a system for compositing a foreground scene including a subject before a nonuniformly illuminated colored backing, and a background scene, and where the nonuniformity is nonlinear from side to side and/or nonlinear from top to bottom. A window is employed to mask unwanted areas outside of, or on, the colored backing and one or more window edges form a visible join line where the window edges join the backing. The visible join line is made nonvisible without affecting the subject by a horizontal and vertical linear interpolation method for obtaining backing corrections that cause the backing level control signal to be uniform at the window edges and match an assigned window signal level. To use the invented method, a first reference point on the backing is selected and its RGB levels are stored as RGB reference levels. The RGB levels of a first pixel on a first scan line to enter the colored backing area are compared with the RGB reference levels and their differences are stored as RGB corrections for the first pixel. The RGB levels of a last pixel on said first scan line to cross the colored backing area are compared with the RGB reference levels and their difference are stored as RGB corrections for the last pixel. RGB corrections for all other pixels on the first scan line are determined by linear interpolation between the correction values determined for the first and said last pixel and these corrections are stored. A first set of correction values for all pixels on the backing area for each subsequent scan line which crosses the colored backing are determined in the same manner to provide a first set of correction values for all pixels on the backing area. The first set of correction values are added to the foreground scene RGB signals to correct said backing for nonuniformity in the vertical direction. A second reference point is selected and its RGB levels stored as second RGB reference levels for vertical interpolation. The RGB levels of the first pixel on the first scan line to enter the colored backing area are compared with the second RGB reference levels and their differences are stored as a second correction for the first pixel. The RGB levels of the first pixel of the last scan line to enter the colored backing area are compared with the second RGB reference levels and their difference are stored as a second correction for said first pixel on said last scan line. The RGB corrections for all other pixels in the column of pixels between said first pixels on said first and last scan lines are determined by linear interpolation between the stored corrections for the two first pixels and the corrections are stored in memory. A second set of corrections for the area enclosed by the window for each subsequent pixel on the first and last scan lines are determined in a similar manner to produce a second set of corrections for the area enclosed by the window. The second set of corrections are added to the foreground scene RGB signals to correct the backing for nonuniformity in the horizontal direction. A background scene level control signal is generated proportional to the luminance and visibility of the corrected backing. The background scene level control signal at the window edge is assigned as a window level control signal thus producing a non visible join line between the window edge and the backing.

DETAILED DESCRIPTION OF THE INVENTION

To generate nonvisible window edges it is necessary to adjust the signal level of the window to match the signal level produced by the colored backing, or to adjust the signal level produced by the backing to match the signal level of the window, without affecting the subject. Adapting the window signal to match the signal generated by the luminance of the backing eliminates the visibility of a join line, but it does nothing to correct the nonuniformity of the backing. The backing nonuniformity is simply extended out into the window area. This simple adaptive method is therefore limited to those situations where the backing luminance variations are small, smooth and gradual.

Correcting the backing luminance and color to generate a control signal matching the window signal level, generates nonvisible window edges and also improves backing luminance and color uniformity. Both procedures are explained below.

The choice of adapting the window signal or of correcting the backing, or of using both procedures depends upon the extent and manner in which the backing luminance is non uniform. A backing whose luminance varies smoothly, can achieve non visible window edges by adapting the window to the backing.

The Adaptive Window Signal Method

Figure 1:
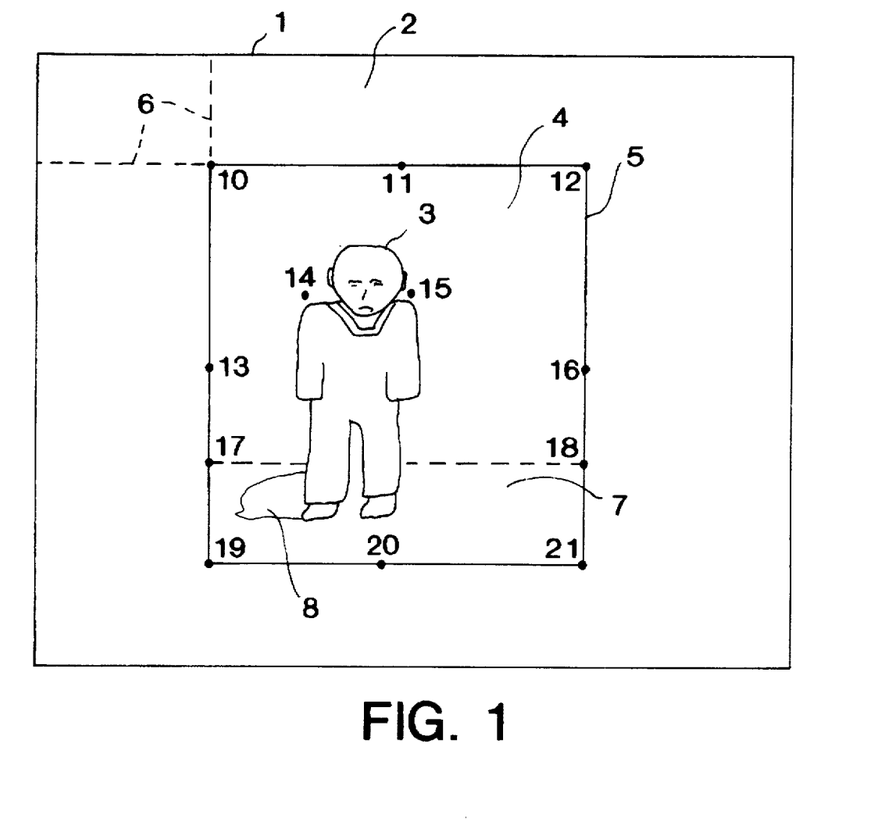
FIG. 1 is a camera field of view which includes a window forming a masked area that masks all of the camera field except for the colored backing area and a foreground subject.

Referring to FIG. 1, the camera field of view 1 includes a window forming a masked area 2 that masks all of the camera field except for the colored backing area 4 as seen through the window opening 5. A subject 3 appears before the colored backing, with the subject's shadow 8 falling on the backing in the floor area.

A scan line passing through pixels 10, 11 and 12 is defined as the top scan line within the colored backing. Each column of pixels in the masked area 2 above this line is assigned the value of control signal $E_c$ determined for each pixel on line 10, 11, 12.

The column of pixels 10, 13, 17 and 19 represents the left edge of the backing and adjoins the left window edge. Each row of pixels on each scan line in the masked area to the left of a line passing through pixels 10, 13, 17 and 19 is assigned the value of $E_c$ determined for each pixel in column 10, 13, 17, 19. Similarly, the areas to the right of pixel column 12, 16, 18 and 21, and the area below a scan line passing through pixels 19, 20 and 21 are assigned the value of the adjacent $E_c$ on the colored backing.

The column of pixels above pixel 10, and all pixels on the scan line to the left of pixel 10 are assigned the value of the control signal existing at pixel 10, therefore all unassigned pixels in the rectangular corner area 6 may be assigned the control signal level found at pixel 10. In the same manner, the other three corners are assigned the $E_c$ signal levels found at pixels 12, 21, and 19 (of course substituting "below" and "right of" for "above" and "left of" where appropriate).

All of the assigned $E_c$ levels are placed in a memory since they will be needed for each field or film frame. All of the pixels assigned an $E_c$ represent the backing and are equal to the $E_c$ generated by the backing where the backing joins the window.

The above procedure causes the window edge to become invisible without any affect upon the subject. This method is satisfactory when the backing nonuniformity is small and changes smoothly.

While the method described above matches the $E_c$ levels at the join line, it does not cause any correction for the nonuniformity of the backing. Whatever nonuniformity exists on the backing is simply extended into the masked area.

The Linear Interpolation Method

The linear interpolation method for obtaining corrections for the colored backing may be achieved by horizontal or vertical interpolation, or both, depending on how the backing luminance is distributed. Vertical nonlinearity is typical of a backing (FIG. 1) that extends onto the floor 7, with a rounded coving joining the wall and floor intersection at a line passing through pixels 17 and 18.

Standing alongside the camera, a person looking at a blue backing will observe the vertical portion of the backing at an angle approximately normal (90°) to the backing, and the backing will appear to be a deep blue. The floor (framed by pixels 17, 18, 21, 19) is viewed at a rather shallow angle and will appear to be a bluish gray color. This gray cast is due to the wide angle scatter of white incident light by the diffuse surface of the colored backing. The floor area therefore differs from the vertical surface in both luminance, and color.

The control signal $E_c$ (Eq. 1) will be greater for the vertical part of the backing than for the floor area because it has a greater blue-green difference. Subtracting matching levels of $E_c$ from the foreground RGB signals can reduce the RGB levels of the vertical backing area just to zero, as described in the above-referenced patents. The floor area however, generating a smaller $E_c$, is not quite reduced to zero. The residual signal results in a gray veiling on the floor, extending up into the coring. Unless corrected, this gray veiling will transfer and be superimposed over the background scene. The nonuniformity, being vertical, is corrected by horizontally interpolated corrections obtained from the backing at the left and right window edges. Backing luminance (and color) correction by horizontal linear interpolation, produces nonvisible left and right window edges and also eliminates floor veiling.

For similar reasons, a curved backing that wraps around a corner will present a change of angle presented to the camera, and will cause horizontal nonlinear luminance distribution. If the top and bottom window edges are to remain nonvisible, then RGB backing corrections obtained by vertically interpolated corrections must also be applied to the foreground scene RGB signals.

Referring to FIG. 1, a point on the backing (e.g. point 14) is selected to act as a fixed reference. Its RGB levels become the RGB reference. The first scan line that appears on the backing is the line passing through pixels 10, 11, 12. The RGB levels at the first pixel (point 10) is compared with the RGB reference and their difference is stored in memory. The RGB levels at the last backing pixel (point 12) on this first scan line are compared to the RGB reference and their difference is stored in memory.

Using the RGB correction values determined for points 10 and 12, the required corrections for each pixel on line 10, 11, 12 is determined by linear (straight line) interpolation from point 10 to point 12, of the RGB corrections at points 10 and 12. By the same process used for line 10, 11, 12, RGB corrections are generated for all scan lines that cross the backing. The corrections obtained by linear interpolation are placed in memory, and are added to the foreground scene RGB signals.

The subsequent background scene level control signal $E_c$, (Eq. 1), generated from the corrected backing, will be identical for all points along left window edge 10, 13, 17, 19 and right window edge 12, 16, 18, 21. When this value of $E_c$ is assigned as the window level control signal, the left and right window edges become nonvisible. Assuming the horizontal luminance nonuniformity is linear, the top and bottom window edges also become invisible.

By linking the window level to the $E_c$ control level, adjustments to the level of the background scene automatically adjust the window level to maintain nonvisible window edges.

The RGB reference was selected at a point on the vertical section of the backing, therefore all pixels on the backing adjacent to the left and right window edges are corrected to the RGB levels matching the RGB reference. By matching RGB signal levels, both luminance and color are matched. Assuming the luminance distribution across the backing is linear, the floor veiling is eliminated.

Since the luminance distribution across the backing may not be perfectly linear, the top and bottom window edges, and floor veiling, may not become completely invisible. Pushing $E_c$ into a clip, set to the window level, will cause these edges and floor veiling to become invisible. The use of a small clip action is useful when it does not exceed an acceptable threshold. An operator determines an appropriate and optimum clip level by observing the composite image.

When the required amount of clip to eliminate window edge visibility exceeds an acceptable threshold, (by showing excessive edge glow on the subject) the clip cannot be used and it becomes necessary to apply corrections obtained by vertically interpolated corrections.

Difficulties in obtaining uniform illumination, floor shoots, and lens vignetting always result in some non linearity in both axes. Therefore, corrections obtained by two axis interpolation is preferred for the elimination of window edge visibility.

Two Axis Interpolation Method

Figure 2A:
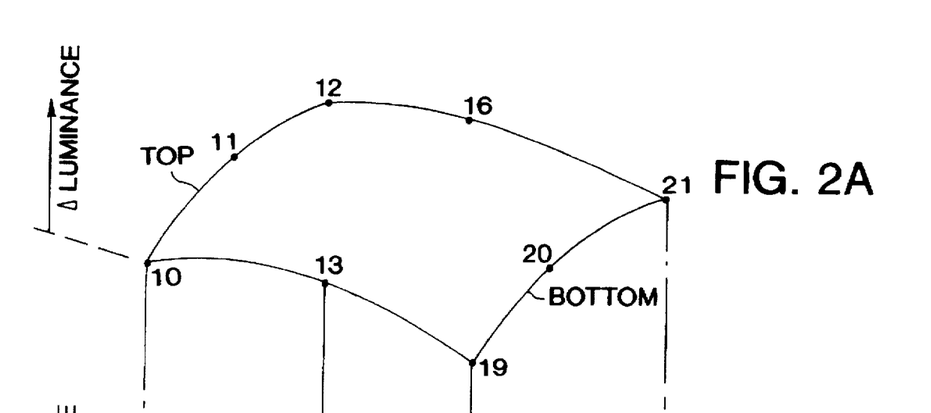
FIG. 2 is shows several luminances pattern of a backing when plotted in three dimensional space.

The luminance pattern of a backing, whose illumination falls off from the center toward the sides and corners, when plotted in three dimensional space, will appear to be a shallow rectangular section of the surface of a sphere as shown in the top portion of FIG. 2 referenced by 2A; a section whose center is higher than its edges and whose edges are higher than its corners.

Figure 2B:
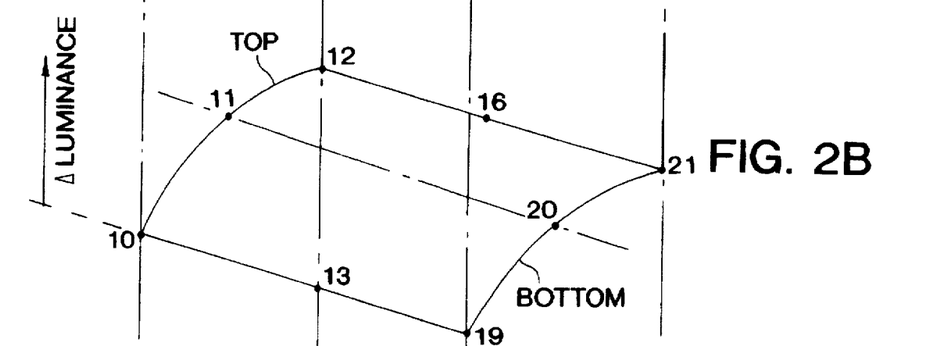

A first set of corrections, obtained by horizontal linear interpolation as described in the preceding section, is placed in memory. When added to the foreground scene RGB signals, these corrections cause the backing pixels adjacent to the left and right window edges to have a constant level equal to the reference RGB. The three dimensional figure, referenced by 2B, now assumes the approximate shape of a shallow section of a cylinder, whose axis is vertical (assuming the top/bottom orientation shown), as shown in the middle portion of FIG. 2. The left and right edges, 10, 13, 19 and 12, 16, 21, become straight lines parallel to the axis, and whose RGB levels exactly match those of the reference point.

The luminance at the top and bottom edges of the backing will deviate from a straight line by rising (in this example) above the corrected left and right window edges as shown in the example referenced by 2B. After the backing has been partially corrected by horizontal interpolation as shown by the figure referenced by 2B, a second set of corrections is obtained by vertical interpolation.

From FIG. 1, the first pixel, point 10, on line 10, 11, 12 forms the head of a column of pixels ending at point 19. Similarly, every pixel along horizontal scan line 10,11, 12 forms the head of similar columns of pixels ending on line 19, 20, 21. By comparing the RGB levels of the pixels at both ends of each column with a selected RGB reference, corrections for all pixels along scan lines 10, 11, 12 and 19, 20, 21 are determined and placed in memory. Corrections for all other pixels in each column are determined by linear interpolation between the corrections in memory previously determined for each end of each column, thereby forming a second set of corrections for the colored backing.

Figure 2C:
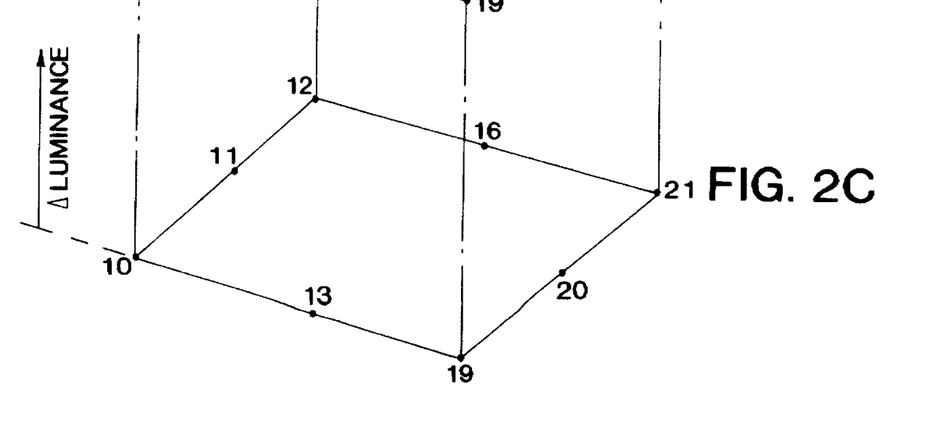

This second set of corrections is added to the foreground scene RGB signals previously corrected by horizontal interpolation. The resulting backing luminance distribution is essentially the flat plane referenced by 2C of FIG. 2. Its four edges are exactly equal to the level of the RGB reference selected for vertical interpolation. The two axis correction is exact for the backing area adjacent to the window edges, and is nearly correct for the rest of the backing. The backing luminance nonuniformity remaining in the plane represented by 2C will be at least an order of magnitude smaller than the nonuniformity existing in the uncorrected backing represented by the spherical portion referenced by 2A.

The results of two axis correction are unchanged if the order of the two axis correction is reversed. The first set of corrections are those determined first, which may be either vertical or horizontal.

In examining the spherical portion referenced by 2A, one might assume that a non-linear interpolation of edge corrections might provide a better result since the non-uniformity appears to be non-linear. However, as one portions 2B and 2C, it can be seen that the function of linear interpolation is to remove the non-linearity of luminance distribution. Ideal non-visible window edges are achieved with the simplicity of linear interpolation. Generating non-linear corrections adds complexity without improving the result.

It should be noted that any luminance distribution shape in 2A will be corrected by horizontally interpolated corrections to a shape similar to 2B, with straight line left and right edges of constant and uniform luminance and color. A second correction by vertical interpolation will reduce convolutions in the top and bottom edges to the flat plain of 2C. When backing luminance distribution is random and spotty, the plane of 2C will show small lumps and shallow depressions, but its four edges will be straight parallel lines in a single plane and therefore produce non visible window edges.

The lumps represent hot spot areas that are overcorrected, while the depressions represent shadows or under illuminated areas. Comparing the RGB levels of each pixel in the unobscured backing area (which is defined as PRV=0, and $E_c>0$) with the RGB levels of the second reference determines the exact amount of correction needed for that pixel. When the needed correction is less than the amount of correction determined by interpolation, the needed correction is used thereby preventing over correction. When the needed correction is greater than the correction determined by interpolation, the interpolated correction is used thereby preserving shadows.

The window level is assigned and linked to the level of control signal $E_c$ at the window edge, thereby automatically keeping all four window edges non visible at all adjustments of the background scene level control.

Corrections established by linear interpolation are not influenced by the presence or absence of a subject. However if a subject is present, then any corrections that may exist in the area occupied by the subject will be added to the subject, unless inhibited in the subject area. A reference point is selected on the backing close to the subject so there will be little or no correction needed at the subject, and therefore little need to inhibit these corrections. The second RGB reference may be the same as the first. When both axes are corrected, the second reference RGB sets the level of correction adjacent to the subject.

If the RGB levels of the second reference are multiplied by a variable factor, such as 0.5x to 1.5x for example, the luminance plane of 2B may be elevated or depressed with respect to the subject. The corrections adjacent to the subject may therefore be varied from a negative correction, through zero correction, to a positive correction. When the corrections adjacent to the subject can be adjusted to be zero or very close to zero, the corrections may be added directly to the foreground scene RGB signals without being inhibited.

When the subject occupies a large part of the frame, one is not likely to achieve zero corrections simultaneously on all sides of the subject, and corrections must therefore be inhibited. $E_c$ may be used as an inhibit signal, and is calculated from equation 1. The inhibit signal, because it is linear, fully inhibits corrections in opaque areas of the subject, partially inhibits corrections in partially transparent or translucent subject areas, and reduces corrections in shadow areas proportional to the density of the shadow.

A first set of corrections, generated by a first axis interpolation, are inhibited by multiplying with $E_c$ obtained from the uncorrected backing. The inhibited corrections are stored and also temporarily added to the foreground scene RGB signals. A second set of corrections, generated by a second axis interpolation, can only be generated from a backing that is first corrected by the first axis interpolated corrections.

The second set of corrections may be inhibited by multiplying by an $E_c$ obtained from the backing corrected by the first set of (inhibited) corrections. It is also possible, and simpler, to combine the first and second set of corrections and then inhibit the combined corrections in a single step. The combined inhibited corrections are then added to the uncorrected foreground scene RGB signals.

In motion picture photography, at 24 frames per second, the edges of objects in cross screen motion are always a semitransparent blur, thus they represent a semitransparent transition area between the backing and the opaque subject. Out of focus objects also exhibit a similar semitransparent edge. The transition area, subject area, and unobscured backing area are identified in U.S. patent application, Ser. No. 08/240,881 filed May 9, 1994, U.S. Pat. No. 5,557,339.

| | |
|---|---|
| unobscured backing area | PRV = 0, and $E_c > 0$. |
| transition area | PRV > 0, and $E_c > 0$, |
| opaque subject area | PRV $\geq$ 0, and $E_c = 0$. |

The correction values determined for the colored backing do not want to be inhibited by the inhibit signal. The inhibit signal is therefore clipped at a value of 1.0 if applied to the full area within the window. It is desirable to apply the inhibit signal only to the transition and opaque subject area to avoid clipping the inhibit signal. These areas are identified above. By inhibiting corrections only in the subject and transition areas, the inhibit action can be set to begin just as the scanning spot begins to enter the edge of a semitransparent subject.

Streak Prevention

A spot formed by a patch, a footprint, rub mark or other anomaly often occurs on the colored backing, especially in the floor area. The spot may be lighter or darker than the surrounding backing. When a window edge falls across this spot, the corrections developed by comparison to a reference RGB will provide a proper correction for the full window edge including the pixels in the small local area comprising the spot. While these corrections are proper for the local area of the spot, they are not correct for other areas of the backing. Since these corrections are interpolated across the backing, the visual effect is a streak crossing the backing, with the streak fading away as it reaches the opposite window edge.

The streak is removed by moving the window edge into the streak area and then repeating the process of applying interpolated corrections. The end result of this double correction is a uniform backing, non-visible window edges, and no streaks. If these corrections are to be used for the entire scene, the window may be returned to its initial position. The original corrections between the first and second windows positions remain unchanged. If corrections are to be recalculated for each frame then the window must remain in the second position.

The process of streak removal can be automated by advancing the window edge a selected number of pixels into the streak and repeating the correction process. The RGB levels are then examined along the new window edge. If RGB is not identical for all pixels along this edge, within a set tolerance, the window is advanced again. These actions are repeated until the RGB signals are constant.

Two Area Correction

It may not be possible to move the window edge to avoid a spot on the backing when, for example, the window edge is aligned to match the edge of a building in the background scene. Also, if the floor is quite dirty, it may require several moves to find a window edge position that produces no streaks. Much of the streaking can be avoided by interpolating over a smaller area, without restricting the range of motion of the actor, as will now be described with the aid of FIG. 3.

Figure 3:
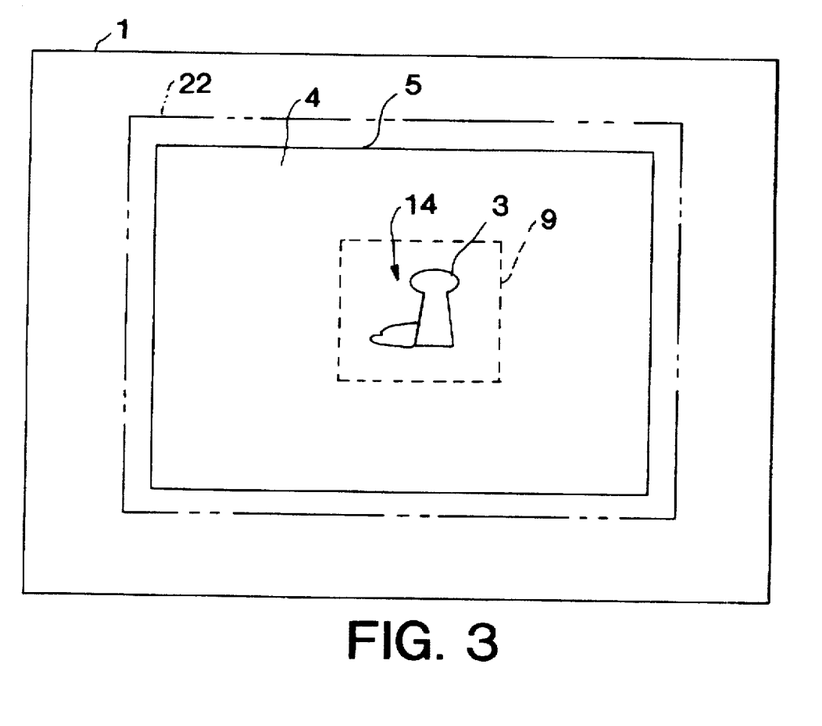
FIG. 3 is another camera field of view used to explain the invention.

Referring to FIG. 3, a window 5 is normally placed so that its edges are close to the edge of the backing 22 thereby providing maximum maneuvering room for the actor or foreground subject 3. The window is used to electronically extend the backing out to the edge of the image frame 1, and in doing so to shut off the foreground scene and to fully turn on the background scene in the areas masked by the window. The $E_c$ control signal developed from the colored backing 4 turns on the background scene in the area of the unmasked backing, beginning at the window edge.

Window controls (part of window generator 34 described below with reference to FIG. 4) may also be used to create the outline of a box 9 closely enclosing the subject 3 and its shadow, if any. The edges of box 9 do not constitute an active window. The RGB levels of all pixels on the colored backing outside box 9 are compared to the RGB of reference point 14, and any difference is stored as corrections. This correction process guarantees non visible window edges 5, and complete backing uniformity up to box 9.

Backing corrections within box 9 are obtained by horizontal and vertical interpolation using reference point 14 as described earlier, and these corrections are also placed in memory. The corrections obtained for area 4 and area 9 together constitute corrections for the full backing within window edges 5. These corrections do not change and may be applied to each frame from memory.

Backing corrections on the entire backing, including backing area 4 and boxed area 9, are inhibited in the subject area by control signal $E_c$. The inhibiting signal must be recomputed for each frame since the subject is in motion. The original position of the window edges 5 and the box edges 9 may remain fixed for the entire scene. When backing corrections are fixed for the entire scene, the subject may move in or out of the scene without triggering a streak.

Moving Camera

All of the above described procedures for maintaining non visible window edges are applied to a scene in which the camera is fixed. There are applications in which the camera is in motion. A moving camera requires sensors, or readouts from the camera head, zoom lens, dolly, etc. to instruct a computer (see FIG. 4 and its corresponding description) to move the windows and background scene in a direction opposite to the camera move so that the window edges and the background scene appear to be fixed in their original position with respect to the backing. The backing may be larger than the field of view of the camera to allow for panning and tilting the camera. The entire backing, with windows in place, may be corrected, with respect to a reference RGB as described below.

The camera is panned and tilted so as to cover the entire backing including all four window edges. Assume the camera must be set to several positions to cover all of the backing. In each of these positions the backing RGB signals along any window edge within the camera field is placed in memory. From these camera positions RGB backing data is acquired for the full length of all four window edges. These RGB signals, when compared to the reference RGB, permit the generation of two axis interpolated corrections that causes all four window edges to become nonvisible. These corrections are fixed with respect to their position on the backing. The window edges are therefore nonvisible whether in or out of the camera view and whether the camera position is fixed or in motion. Window edges remain nonvisible as they move into or out of camera view. Corrections developed by linear interpolation between two values may be at any selected resolution.

Since the subject will be in motion, it is necessary to inhibit the corrections for each camera field in the area of the subject. This may be done by generating an $E_c$ inhibit signal from the RGB data in each camera frame as described earlier.

As the camera pans to bring a given window edge into the camera field, it is first at the edge of the camera field of view, and progresses toward the center. The luminance field of a lens is rarely perfectly flat. To prevent the appearance of a faint window edge, the background scene level control signal $E_c$ may be raised very slightly into a clip set to the window level.

Other Considerations

Referring to FIG. 1, the RGB reference point need not be a specific point on the backing such as point 14. It may be the average of two or more points such as points 14 and 15 or an assigned RGB reference level.

The RGB levels for a given point may be the average RGB of a local pixel group surrounding each point. RGB averaging of small pixel groups reduces the effects of film grain, system noise, and backing anomalies.

In an earlier example, a reference point was selected on the better blue of the vertical blue backing rather than the blue-gray floor. In fact, the reference point need not even be on the backing. The RGB levels of a superior blue backing may simply be assigned as the reference RGB. An ideal blue backing will have a high blue content and a low ,and equal, red and green content. An existing backing having RGB values of 25R, 30G, and 65B, for example, could be improved by arbitrarily setting green to 25 units, making the reference 25R, 25G, and 65B. Equal red and green represents an improved blue color for compositing purposes.

The objective of this invention, to make window edges become nonvisible without affecting the image, was achieved together with some unexpected results. The non uniform backing luminance, with two axis interpolation correction, becomes almost uniform, and perfect uniformity of the backing is often possible by adding a low level clip to the background level control signal. Also, color uniformity is improved, and backing color quality may be improved if desired.

When a subject or its shadow extends to the bottom of the image frame, a bottom window cannot be used, nor is one needed for non visibility of the remaining three window edges. Without a bottom window, the left and right window edges extend to the bottom of the frame. In the absence of a bottom window, the RGB backing data on each side of the subject (on the bottom scan line) may be extrapolated across the subject (and/or its shadow) to approximate the blue backing data that would have been present in the absence of the subject. RGB backing data at the bottom edge of the backing is necessary to permit vertical interpolation.

Since in many cases the actor will extend to the bottom of the frame, the above procedure is used for the bottom edge of the frame (and vertical interpolation). However the same procedure may be used for any edge where the subject or its shadow touches the image frame.

In a real-time system, there may be insufficient time to extrapolate the backing RGB levels across the subject (and/or its shadow). In this case a useful alternative is to assign a set of corrections to permit interpolation. Such an assignment would include a) the corrections existing at the opposite window, b) a zero, c) a constant. An operator makes a selection based upon his examination of the scene. A non visible window edge does not require interpolation all the way across the image. The corrections obtained at any edge of the window may be interpolated to zero at a designated percentage of the frame dimension. This interpolation may be linear or non-linear.

While the original intent was to achieve non visible window edges, two axis interpolated corrections may be used to improve backing luminance and color uniformity by using the four edges of the image frame for the four window edges. All other procedures remain the same.

Linear interpolation of backing data uses RGB signals developed by a camera or film scanner. The RGB levels of the camera are often reformatted to component forms such as Y, u, v, or Y, R-Y, B-Y for recording purposes. Since the components represent the RGB signals, they may be interpolated directly without reformatting to RGB.

Although the backing color has been described as blue, the backing corrections described herein, are not limited to the color blue. Other backing colors simply require interchanging the RGB terms in equation 1.

In one embodiment, each operation (compare, subtract, store, add, limit, multiply, etc.) will be performed by a computer associated with these systems. In an alternate embodiment, all digital real-time hardware is used. The digital functions of compare, subtract, store, add, limit, multiply, etc. are well known functions commonly employed in many digital devices including the Ultimatte-7 and Ultimatte-8 sold by Ultimatte Corporation.

Figure 4:
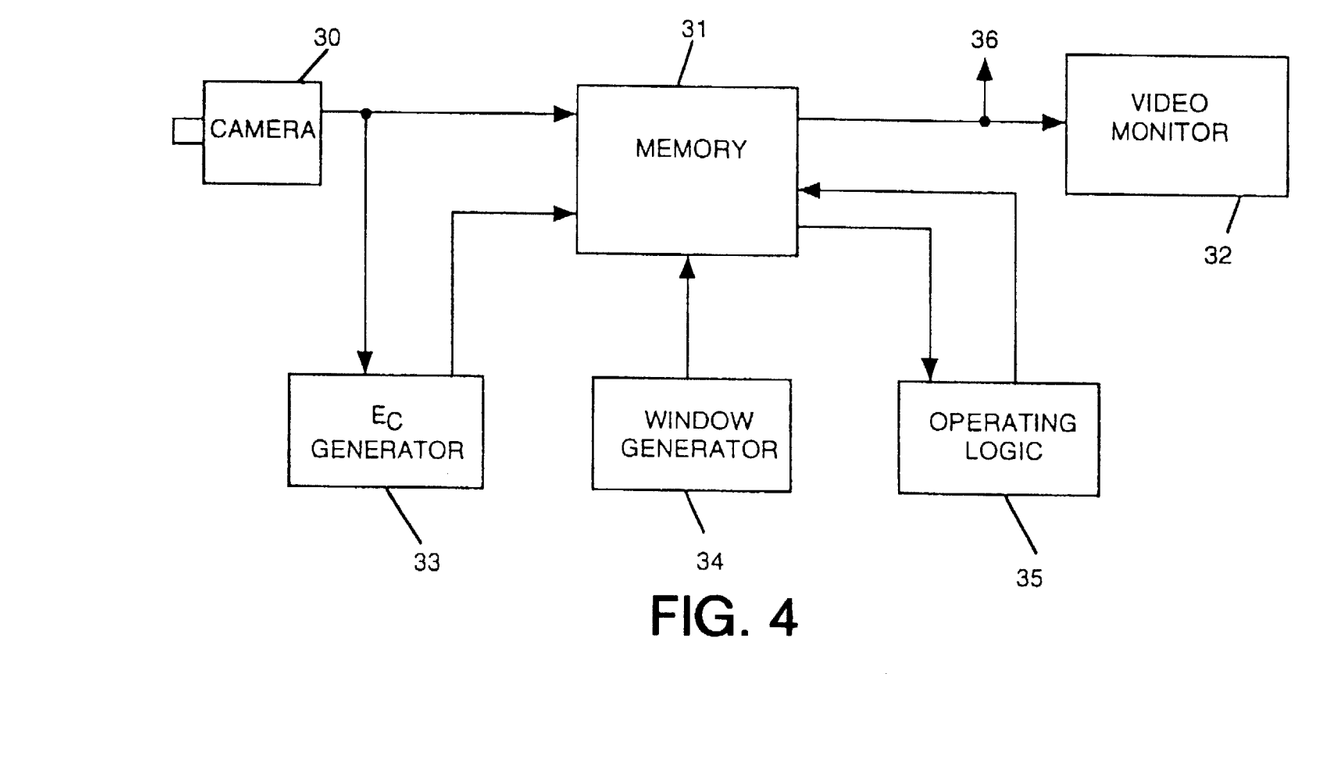
FIG. 4 is a block diagram showing the elements of a system which may utilize the invention.

FIG. 4 is a block diagram showing how elements used to implement the invented system and corresponding methods are interconnected.

Camera 30 delivers the foreground scene RGB signals to memory 31 and to $E_c$ generator 33. The output of memory 31 is displayed on monitor 32. Window generator 34 utilizes controls which permit an operator to size and place a window to frame the subject displayed on monitor 32.

Operating logic 35 performs the functions described above for generating backing corrections by linear interpolation, the adaptive signal method, the two axis interpolation method, streak prevention and two area correction. Also, logic for handling moving camera operations may be implemented in operating logic 35 when appropriate feedback signals from sensors associated with the camera and control signals being provided to control movements of the camera and a dolly track onto which the camera is mounted according to techniques well known in the art.

$E_c$ generator 33 provides an inhibit signal that inhibits corrections in the subject area as the RGB data in memory 31 is being corrected.

The corrected RGB foreground signals, displayed on monitor 32, are provided at output terminal 36, and are suitable for subsequent compositing with a background scene by any compositing system.

$E_c$ generator 33, window generator 34, and operating logic comparable to logic 35, as well as memory 31, are typically incorporated in the compositing hardware for real-time compositing systems such as a Ultimatte-8 compositing system available from Ultimatte Corporation, or in the software of non real-time compositing systems such as a CineFusion compositing system available from Ultimatte Corporation.

The additional logic which would need to be added to existing operating logic 35 (which would be implemented in hardware in a real-time compositing system or as software running in a general purpose computer such as a workstation available from Silicon Graphics) to implement the invention can be easily created by a person skilled in the art based on the descriptions provided herein.

We claim:

1. In a system for compositing a foreground scene including a subject before a nonuniformly illuminated colored backing, and a background scene, and where said nonuniformly illuminated colored backing is at least one of nonlinear from side to side and nonlinear from top to bottom, and where a window is employed to mask unwanted areas outside of, or on, the colored backing and where at least one window edge forms a visible join line where the at least one window edge joins the backing, wherein said visible join line is made nonvisible without affecting the subject by a horizontal and vertical linear interpolation method for obtaining backing corrections that cause a backing level control signal to be uniform at the window edge and match an assigned window signal level, said method comprising the steps of:

a) selecting a first reference point on the backing and storing RGB levels of said first reference point as RGB reference levels for horizontal linear interpolation, b) comparing RGB levels of a first pixel on a first scan line to enter the colored backing with said RGB reference levels and storing their differences as RGB correction values for said first pixel, c) comparing RGB levels of a last pixel on said first scan line to cross the colored backing with said RGB reference levels and storing their difference as RGB correction values for said last pixel, d) determining RGB scan line correction values for all other pixels on said first scan line by horizontal linear interpolation between said stored RGB correction values determined for said first pixel and said last pixel and storing said all other scan line pixel correction values, e) repeating steps b, c, and d, for each subsequent scan line which crosses the colored backing thereby determining RGB scan line correction values for all pixels on the colored backing, f) adding said RGB scan line correction values to foreground scene RGB signals to correct said backing for nonuniformity in a vertical direction, g) selecting a second reference point and storing RGB levels of said second reference point as second RGB reference levels for vertical interpolation, h) comparing the RGB levels of the first pixel on the first scan line to enter the colored backing with said second RGB reference levels and storing their differences as second RGB correction values for said first pixel, i) comparing RGB levels of a first pixel of a last scan line to enter the colored backing with said second RGB reference levels and storing their difference as a second RGB correction values for said first pixel on said last scan line, j) determining RGB correction values for all other pixels in a column of pixels between said first pixels on said first and last scan lines by vertical linear interpolation between the stored RGB correction values for said two first pixels and storing said all other columnar pixel correction values, k) repeating steps h, i, and j, for each subsequent pixel on the first and last scan lines thereby determining RGB columnar correction values for an area enclosed by the window, l) adding said RGB columnar correction values to said foreground scene RGB signals to correct the backing for nonuniformity in a horizontal direction to thereby form a corrected backing.

m) generating a background scene level control signal proportional to the luminance and visibility of said corrected backing, n) assigning said background scene level control signal at the at least one window edge as a window level control signal thus producing a non visible join line between the window edge and said corrected backing.

2. The method of claim 1 in which the second reference point is selected close to the subject.

3. The method of claim 1 in which the first and second RGB reference levels are the same.

4. The method of claim 1 in which the second RGB reference levels are multiplied by a factor between 0.5 and 1.5 to determine minimum possible corrections in a portion of the backing adjacent to the subject.

5. The method of claim 1, in which an interpolated correction for a given pixel is one of greater than and smaller than a correction required for said pixel thereby resulting in one of over correction and under correction, respectively, and where said over correction is prevented and said under correction is prevented while retaining a subject's shadow further comprising the steps of:

a) defining an unobscured backing area as an area of the foreground scene in which PRV=0, and $E_c$>0, where PRV is a processed video signal obtained by subtracting levels of $E_c$ that match backing RGB levels, and $E_c=K((B-K_1)-K_2\max(G,R))$, where R, G, and B are red, green and blue signal levels, and K, $K_1$, and $K_2$ are constants.

b) comparing RGB levels for each pixel in the unobscured backing area with the RGB levels of the second reference point and whose difference defines a potential correction, c) comparing the potential correction with the correction determined by a linear interpolation, d) applying the potential correction in place of the correction determined by the interpolation when the potential correction is smaller, thereby preventing the over correction, e) applying the correction determined by interpolation when said potential correction is the larger, thereby preserving the subject's shadow.

6. The method of claim 1 in which the backing corrections obtained by the horizontal interpolation are first inhibited in a subject area then added to the foreground scene RGB signals to produce the backing corrected for vertical nonlinearity, and where the backing corrections obtained by vertical interpolation are inhibited then added to the foreground scene RGB signals to produce the backing corrected for horizontal nonlinearity, further comprising the steps of:

a) determining a first set of the backing corrections obtained by the horizontal interpolation, b) determining an $E_c$ inhibit signal for each pixel in an uncorrected area encompassed by the window from the RGB levels of the colored backing, c) multiplying said first set of corrections by said $E_c$ inhibit signal to obtain inhibited corrections, d) adding said inhibited corrections to the foreground scene RGB signals to produce nonvisible left and right window edges, e) determining a second set of the backing corrections obtained by the vertical interpolation from said foreground scene RGB signals previously corrected by the horizontal interpolation, f) determining a second $E_c$ inhibit signal from said RGB signals corrected by a first set of the inhibited corrections, g) multiplying said second set of backing corrections by said second $E_c$ inhibit signal, h) adding said second set of backing corrections to previously corrected foreground scene RGB signals to provide nonvisible top and bottom window edges, thereby resulting in all four window edges becoming nonvisible.

7. The method of claim 6 in which the first and second set of backing corrections are added to obtain combined corrections, and said combined corrections are inhibited by control signal $E_c$ generated from the colored backing, and said combined corrections are added to the foreground scene RGB signals to prevent discoloration of the subject.

8. The method of claim 1, 6 or 7 in which inhibit signals are clipped at a value of 1.0 so as to disable an inhibit function in an unobstructed backing area.

9. The method of claim 1 in which the corrections are inhibited only in opaque and semi-transparent subject areas comprising the steps of:

a) generating $E_c$ for each pixel in an area enclosed by the window, where $E_c=K((B-K_1)-K_2\max(G,R))$, where R, G, B are red, green and blue signal levels, and K, $K_1$, and $K_2$ are constants, b) generating a processed video signal, PRV, by subtracting levels of $E_c$ equal to the RGB levels in the colored backing, c) defining a transition area as PRV>0, and $E_c$>0, and the opaque subject area as PRV≧0, and $E_c$=0, d) multiplying the RGB correction values in the defined transition and opaque subject areas by said $E_c$ to inhibit corrections only in the defined transition and opaque subject areas.

10. The method of claim 1, in which the background scene level control signal, $E_c$ is continuously linked to the control of a window level thereby assuring automatic retention of nonvisible window edges as the level of the background scene is adjusted.

11. The method of claim 1 in which backing luminance and color uniformity produced by a two axis interpolation is substantially better than the backing luminance and color uniformity of an uncorrected backing.

12. In a method for producing non visible window edges in a compositing system where said method applies backing corrections obtained by linear interpolation, and said corrections introduce streaks across the backing, said streaks are removed by moving a window edge causing a streak, a predetermined number of pixels at a time into the streak, and repeatedly generating and applying interpolated corrections until no streaks are visible.

13. The method of claim 12 in which the streaks are removed automatically by an auto increment of the window edge into the streak the predetermined number of pixels and repeating the interpolated correction until RGB levels for each pixel along the window edge are within a predetermined tolerance of being identical.

14. In a compositing method employing interpolated backing corrections to achieve nonvisible window edges, without restricting the range of motion of a foreground subject, comprising the steps of:

a) placing windows at an edge of a backing to provide maximum room for the foreground subject's movements, b) using window controls to create a box closely encompassing the subject and a shadow of the subject, if any.

c) comparing the RGB levels of all pixels within the window and outside of said box with reference RGB levels and storing a difference between the RGB levels and the reference RGB levels as corrections.

d) generating two axis corrections by linear interpolation for all pixels within said box and storing said corrections.

e) generating control signal $E_c$ for all pixels within the window and said box.

where $E_c=K((B-K_1)-K_2 max(G,R))$, where R, G, and B are red, green and blue signal levels, and K, $K_1$, and $K_2$ are constants.

f) multiplying said corrections in said window and in said box by $E_c$ to inhibit corrections in a subject area, and adding said inhibited corrections to foreground scene RGB.

g) repeating step f for each image frame in a scene to inhibit corrections in the area of a moving foreground subject.

15. A method for generating nonvisible window edges in an image compositing system that employs a colored backing which is larger than the field of a camera, and computer generated windows to extend a backing to an edge of the camera field when the camera moves to follow the actions of a foreground subject and exposes an edge of the colored backing, said method comprising the steps of:

a) using sensors to generate position signals from a camera head, zoom lens, dolly, and equivalent components which are sent to a computer to move the windows and background scene in a direction opposite to the motion of the camera.

b) placing the camera in a series of positions that permits RGB values of all pixels within the backing bounded by a window to be stored in memory.

c) generating two axis interpolated corrections from the RGB values stored in said memory and storing said corrections.

d) generating a control signal $E_c$ from backing RGB values stored in the memory that lie within the camera field.

where $E_c=K((B-K_1)-K_2 max(G,R))$, where R, G, and B are red, green and blue signal levels, and K, $K_1$, and $K_2$ are constants.

e) inhibiting the corrections in said camera field by multiplying by said $E_c$.

f) adding said inhibited corrections to foreground scene RGB signals within the camera field.

g) assigning a backing $E_c$ level at a window edge as a window level control signal.

h) repeating steps d, e, and f for each camera frame, thereby producing nonvisible window edges in a moving camera scene.

16. The method of claim 1 in which the RGB levels of the first and second reference points employed for the generation of the RGB scan line correction values is an average RGB level of at least two points on the backing.

17. The method of claim 1 in which the RGB levels determined for a given pixel address comprises the average RGB level of a predetermined number of pixels in close proximity to a designated pixel thereby minimizing system noise and visibility of film grain.

18. The method of claim 1, in which the corrections for producing non visible-window edges also correct for and improve the color quality of the backing by selecting an RGB reference level that represents the color of a superior backing.

19. The method of claim 1 in which the generation of nonvisible window edges also results in improved backing luminance and color uniformity as compared to a method which does not generate nonvisible window edges.

20. The method of claim 1 in which the subject or a shadow of the subject extends to a bottom of an image frame thereby preventing the use of a bottom window edge for generating the corrections needed for vertical interpolation between top and bottom window corrections, and said bottom edge corrections are generated by RGB levels obtained by interpolating RGB levels of a bottom scan line across the subject or shadow to generate RGB data approximating RGB levels that would have been present in the absence of the subject.

21. The method of claim 20 wherein the subject extends to an image frame edge other than the bottom.

22. The method of claim 1 in which the subject or a shadow of the subject extends to the bottom of an image frame thereby preventing the use of a bottom window edge for generating corrections needed for vertical interpolation between top and bottom window corrections, and where said bottom edge corrections are assigned as one of, a) top window edge corrections, b) zero, and c) a constant.

23. The method of claim 22 in which zero is selected as the bottom window edge corrections and where said zero may be placed at an intermediate position above the bottom edge of the frame.

24. The method of claim 1 in which backing luminance and color uniformity is improved by the backing corrections obtained by two axis interpolation when no windows are present, by substituting the four edges of an image frame for the window edges.

25. The method of claim 1 in which interpolation is performed with an RGB equivalent.

26. The method of claim 25 in which the RGB equivalent is Y, u, v.

27. In a system for compositing a foreground scene including a subject before a nonuniformly illuminated colored backing, and a background scene, and where a window forming a colored backing area is employed to mask unwanted areas outside of, or on, the colored backing and where one or more window edges show a visible line where the window joins the backing, said visible line is made non visible by a method that adapts a window control signal level to match a background scene control signal level comprising the steps of:

a) determining RGB signal levels for a first pixel on the colored backing encountered by a first horizontal scan line to enter said backing area.

b) determining an $E_c$ background scene level control signal generated by said RGB signal levels found at said first pixel.

where $E_c=K((B-K_1)-K_2 max(G,R))$, where R, G, and B are red, green and blue signal levels, and K, $K_1$, and $K_2$ are constants.

c) assigning said $E_c$ control signal as a window level control signal for all pixels on said first horizontal scan line prior to encountering said first pixel.

d) determining and assigning an appropriate $E_c$ control signal to all pixels on the second and successive scan lines to enter the colored backing area by the method described for the first scan line to enter the colored backing area.

e) determining RGB signal levels for a last colored backing pixel encountered by the first horizontal scan line as the first horizontal scan line leaves said colored backing area.

f) determining the $E_c$ control signal from said RGB signal levels and assigning said $E_c$ control signal as the window level control signal for all pixels on said first horizontal scan line following said last backing pixel, g) determining and assigning an appropriate $E_c$ to all pixels on successive scan lines to leave the colored backing area by the method described for the first scan line to leave the backing area, h) determining a level of $E_c$ for all pixels on said first scan line within the colored backing area and assigning $E_c$ levels to all pixels in a pixel column directly above each pixel on said first scan line, i) determining a level of $E_c$ for all pixels on said last scan line within the colored backing area and assigning said $E_c$ levels to all pixels directly below each pixel on said last scan line, j) assigning an existing $E_c$ level to any adjacent pixel whose $E_c$ level has not already been assigned, k) storing in a memory all assigned levels of $E_c$ and utilizing said stored $E_c$ levels as the window level control signal thus causing a window area to have an identical control signal level as the backing at all points where the window and backing meet, thereby making a join line invisible.

28. A method for eliminating window edge visibility, in an image compositing system using windows, that corrects a backing luminance and color nonuniformity by correcting backing RGB signals along window edges to match an RGB reference, and interpolating said corrections to foreground scene RGB signals.

29. A method for compositing a foreground scene including a subject before a nonuniformly illuminated colored backing, and a background scene, and where said nonuniformly illuminated colored backing is at least one of nonlinear from side to side and nonlinear from top to bottom, and where a window forming a colored backing area is employed to mask unwanted areas outside of, or on, the colored backing, said method comprising the steps of:

a) selecting a reference point within the backing area and storing RGB levels of said reference point as RGB reference levels, b) comparing RGB levels of a first pixel on a first scan line to enter the colored backing area with said RGB reference levels and storing the differences as RGB correction values for said first pixel, c) comparing RGB levels of a last pixel on said first scan line to cross the colored backing area with said RGB reference levels and storing the difference as RGB correction values for said last pixel, d) determining RGB correction values for all other pixels on said first scan line by linear interpolation between said correction values determined for said first pixel and said last pixel and storing said all other pixel correction values, e) repeating steps b, c, and d, for each subsequent scan line which crosses the colored backing thereby determining a first set of correction values for all pixels within the backing area, f) adding said first set of correction values to a set of foreground scene RGB signals to correct said nonuniformly illuminated colored backing area in the vertical direction thereby forming a corrected backing.

30. A method for compositing a foreground scene including a subject before a nonuniformly illuminated colored backing, and a background scene, and where said nonuniformly illuminated colored backing is at least one of nonlinear from side to side and nonlinear from top to bottom, and where a window forming a colored backing area is employed to mask unwanted areas outside of, or on, the colored backing, said method comprising the steps of:

a) selecting a reference point and storing RGB levels of said reference point as RGB reference levels for vertical interpolation, b) comparing RGB levels of a first pixel on a first scan line to enter the colored backing area with said RGB reference levels and storing the difference as a first RGB correction value for said first pixel, c) comparing RGB levels of the first pixel of a last scan line to enter the colored backing area with said RGB reference levels and storing the difference as a second correction value, d) determining RGB correction values for all other pixels in a column of pixels between said first pixels on said first and last scan lines by linear interpolation between the stored correction values for said two first pixels and storing said correction values in a memory, e) repeating steps b, c, and d, for each subsequent pixel on the first and last scan lines thereby determining a set of correction values for an area enclosed by the window, f) adding said set of correction values to a set of foreground scene RGB signals to correct the colored backing area for nonuniformity in the horizontal direction thereby forming a corrected backing.

31. The method defined by claim 29 further comprising the steps of:

a) generating a background scene level control signal proportional to luminance and visibility of said corrected backing, b) assigning said background scene level control signal at a window edge as a window level control signal thus producing a non visible join line between the window edge and said backing.

32. The method defined by claim 30 further comprising the steps of:

a) generating a background scene level control signal proportional to luminance and visibility of said corrected backing, b) assigning said background scene level control signal at a window edge as a window level control signal thus producing a non visible join line between the window edge and said backing.

* * * * *